UNITED STATES PATENT OFFICE.

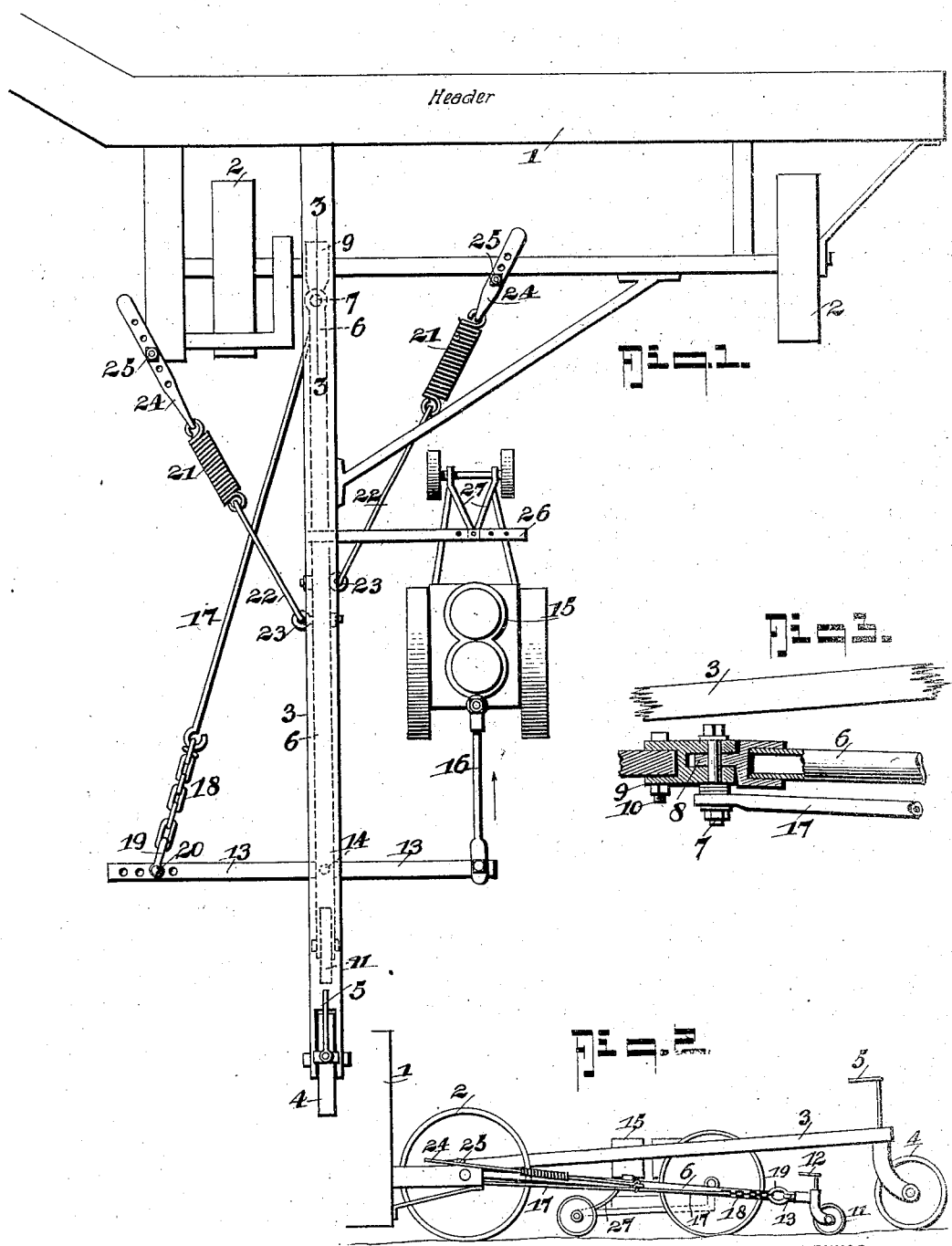

EDWARD A. KIRCH, OF RUSH CENTER, KANSAS.

TRACTOR-HITCH.

1,198,853.

Specification of Letters Patent.

Patented Sept. 19, 1916.

Application filed May 23, 1916. Serial No. 99,307.

*To all whom it may concern:*

Be it known that I, EDWARD A. KIRCH, a citizen of the United States, and a resident of Rush Center, in the county of Rush and State of Kansas, have invented new and useful Improvements in Tractor-Hitches, of which the following is a specification.

My invention is an improvement in tractor hitches, and has for its object to provide mechanism of the character specified for permitting a tractor to be attached to a binder or header, in such manner that the tractor may push and guide the binder or header through the field.

In the drawings: Figure 1 is a top plan view of the improvement in use, Fig. 2 is a side view, and Fig. 3 is a section on the line 3—3 of Fig. 1.

The present embodiment of the invention is shown in connection with a binder or header indicated generally at 1, and having rear supporting wheels 2 journaled on the header. The push beam to which the tractor is connected is arranged directly below the header beam 3, and the said header beam is supported at its rear end by the usual steering wheel 4 operated by means of the steering handle 5 in the usual manner. The push beam 6 is hinged at its front end on a bolt 7 which passes through a lug 8 at the end of the beam, and through lugs in a clamp 9, which is connected to the header as indicated at 10. The push beam may swing laterally with respect to the header beam, and the rear end of the push beam is supported by a caster wheel 11.

An evener bar 13 is pivotally connected to the push beam as indicated at 14, intermediate the ends of the bar and near the rear end of the beam, and the tractor indicated generally at 15, is connected to one end of the evener bar by means of the draft link or bar 16. This bar is pivoted at one end to the end of the evener and at the other end to the tractor, and a stay 17 connects the other end of the evener bar with the bolt 7. This stay 17 has one end connected with the bolt 7, which is the king bolt, in the manner shown in Fig. 3, and a flexible member 18, as for instance a chain, is connected with the hook at the rear end of the stay. The opposite end of the evener bar from the draft link 16 is provided with a series of openings, extending longitudinally of the evener bar, and the chain 18 has at its outer end a clip 19, which is adapted for connection with one of the openings by means of a bolt 20. The stay as a whole, may be varied in length by engaging different links of the chain 18 with the hook, or by engaging the bolt 20 with different openings in the end of the evener bar.

Since the stay 17 is pivoted on the bolt 7, which pivotally connects the push beam to the header, it will be obvious that the push beam may be steered with respect to the header to steer and guide the same. Resilient mechanism is provided for normally holding the push beam in a predetermined position with respect to the header, and to restore the parts to normal position whenever they are turned with respect to each other. The said mechanism comprises coil springs 21, arranged on opposite sides of the push beam, and connected at their end to the header and to the push beam respectively. Each spring is engaged at one end by a link 22 which connects the spring with an eye 23 on the push beam, and at the other end each spring is engaged by an adjusting bar 24. The adjusting bars have longitudinally extending series of openings which are adapted to receive bolts 25 for connecting the adjusting bars to elements of the header. The springs are inclined outwardly and forwardly from the push beam to their connection with the header, and it will be obvious that whenever the beam is swung laterally in either direction with respect to the header, the springs will tend to restore the beam to normal position, while the springs will not interfere with the turning of the header.

A tractor guide 26 extends laterally from the header beam, and the front axle of the tractor is connected to the guide, by means of a draft yoke 27. The body of this yoke is connected to the guide, by means of a bolt or the like passing through an opening in the body, and one of a series of openings in the guide and the arms are connected with the front axle. When the header beam is swung to the right, at its rear end for instance, by means of the steering wheel 4, the engine will be automatically guided in the proper direction by the guide 26, which will swing the wheels or the front axle in the proper direction. It will be understood that in tractors having pivoted spindles, the arms of the yoke will be connected to the spindles.

In operation, the stay 17 prevents forward swinging movement of that end of the evener bar connected to the tractor, and the springs hold or balance the beam, so that there is no tendency to side draft. When the driver wishes to turn, he will swing the wheel 4 in the proper direction and the engine will be automatically guided in the same direction.

I claim:

1. In combination with a binder or header, of a push beam pivoted at its front end to the rear end of the binder or header, a caster wheel supporting the rear end of the push beam, an evener bar pivoted transversely of the beam near its rear end, a stay arranged between one end of the bar and the pivotal connection of the beam, a draft link connected with the other end for connecting a tractor to the said end, a rigid guide extending laterally from the beam, a yoke comprising a body pivoted to the guide, and arms extending forwardly for connection with the front wheels of the tractor, and resilient braces arranged between the push beam at each side thereof and the header for normally holding the push beam parallel with the direction of motion of the header.

2. In combination with a binder or header, of a push beam pivoted at its front end to the rear end of the binder or header, a steering or caster wheel supporting the rear end of the push beam, an evener bar pivoted transversely of the beam near its rear end, a stay arranged between one end of the bar and the pivotal connection of the beam, a draft link connected with the other end for connecting a tractor to the said end, a rigid guide extending laterally from the beam, a yoke comprising a body pivoted to the guide, and arms extending forwardly for connection with the front wheels of the tractor.

EDWARD A. KIRCH.

Witnesses:
 RAY MARTIN,
 CHAS. H. BEATON.

Copies of this patent may be obtained for five cents each, by addressing the "Commissioner of Patents, Washington, D. C."